Mar. 20, 1923.
R. M. ZIMMERMAN
PNEUMATIC BALL VALVE
Filed Feb. 14, 1919
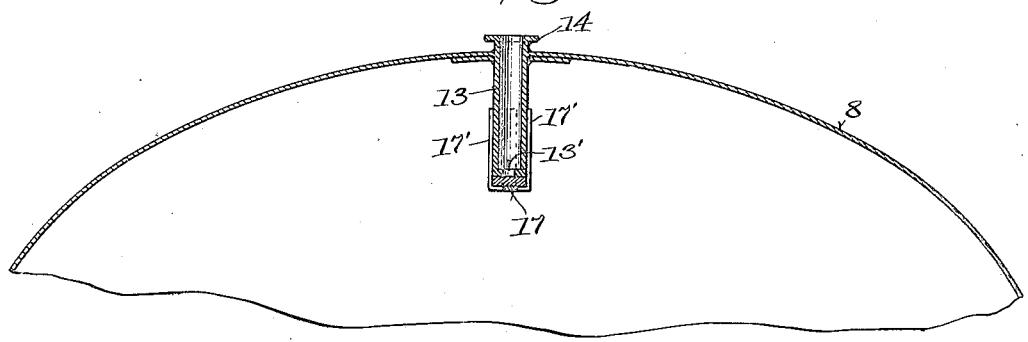
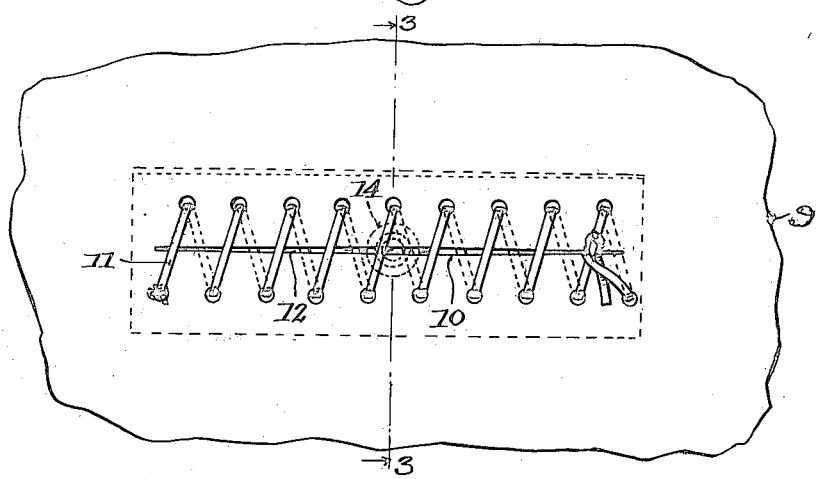
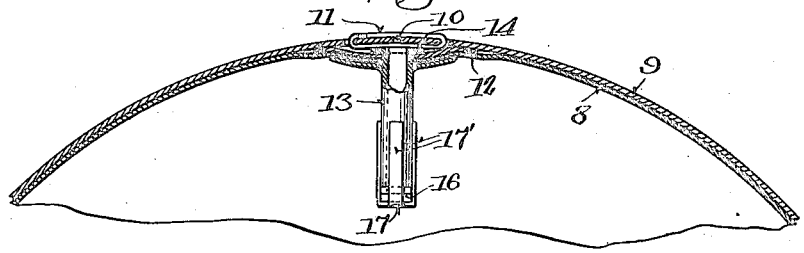
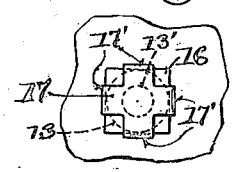
Inventor
Robert M. Zimmerman
By Morsell & Keeney
Attorneys.

Patented Mar. 20, 1923.

1,449,209

UNITED STATES PATENT OFFICE.

ROBERT M. ZIMMERMAN, OF MILWAUKEE, WISCONSIN, ASSIGNOR OF ONE-HALF TO GEORGE Z. DANIELS, OF MILWAUKEE, WISCONSIN.

PNEUMATIC-BALL VALVE.

Application filed February 14, 1919. Serial No. 276,998.

*To all whom it may concern:*

Be it known that I, ROBERT M. ZIMMERMAN, a citizen of the United States, and resident of Milwaukee, in the county of Milwaukee and State of Wisconsin, have invented new and useful Improvements in Pneumatic-Ball Valves, of which the following is a description, reference being had to the accompanying drawings, which are a part of this specification.

This invention relates to improvements in pneumatic ball valves.

It is one of the objects of the present invention to provide a valve which while particularly adapted for foot balls, basket balls, swimming balls, punching bags or other analogous articles in which an inner inflatable casing is enclosed within an outer protecting cover, is also adapted for other uses.

Pneumatic balls of various kinds used in athletic sports or games are usually formed of an outer protecting casing and an inner inflatable member having an outwardly projecting flexible valve tube for inflating the inner member. The outer casings are usually provided with laced slit portions through which the valve tubes are extended during the inflating process. When inflated the valve tubes are bent inwardly through the slits and between the side walls of the inner and outer members, and the slit portions are laced to hold the valve tube in place. The inner member and the valve tube are usually formed of rubber and the short right angular bend of the tube, when bent between the two members, ofttimes causes a break in the wall of the inner member or the valve tube at the point of junction between the two parts. Furthermore the valve in the form of a metal tube is inserted in the valve tube and forms a hard portion interposed between the walls of the inner and outer ball members which has a tendency to abrade the inner member when subjected to the hard usage usual in athletic sports. Also the metal valve is usually formed of a valve member, a coiled spring and threaded parts which necessarily are of minute size and therefore very delicate and liable to easily get out of order and permit the escape of air from the inner member.

It is one of the objects of the present invention to overcome the before-mentioned objectionable features and provide a pneumatic ball valve which is of simple construction, is strong and durable, and is well adapted for the purpose described.

A further object of the invention is to provide a pneumatic ball valve in which the valve tube and valve are located within the inflatable inner member, and are both formed of rubber or other like flexible material.

A further object of the invention is to provide means for retaining the valve tube opening of the inner member in register with the laced slit or the outer covering to permit easy inflation of said inner member.

With the above and other objects in view the invention consists of the improved pneumatic ball valve and its parts and combinations as set forth in the claim and all equivalents thereof.

In the accompanying drawing in which the same reference character indicates the same parts in all of the views:

Fig. 1 is a sectional view of one side portion of the inner inflatable member of a pneumatic ball provided with the improved valve construction;

Fig. 2 is an outside view of the laced slit portion of the complete pneumatic ball;

Fig. 3 is a sectional view of a portion of the pneumatic ball taken on line 3—3 of Fig. 2; and Fig. 4 is a detail end view of the inner end of the valve tube and a portion of the inflated member.

Referring to the drawing the numeral 8 indicates the inner inflatable member which may be of oval or spherical shape and preferably formed of rubber or other like air tight material. The said inner member is usually enclosed within an outer protecting casing 9 formed of relatively inextensible material, such as leather, and this outer casing is usually provided with a slit or elongated opening 10 which is closed by a lacing cord or strip to permit easy access to the inner inflatable member. An inner flap 12 is stitched or otherwise fastened along one side edge to the outer casing and is positioned to cover the inner side of the opening 10 of the outer casing.

The inner member 8 is provided with a valve tube 13 also formed of rubber or like material which projects inwardly from one side wall of the inner member and is molded or vulcanized thereto. The outer open end of the valve tube projects slightly beyond the outer surface of the inner member and is formed with an annular head or flange 14 which is extended through a short slit or opening 15 to prevent the creeping of the inner member with relation to the outer casing and to maintain the valve tube in register with the opening of the outer casing.

The opening 13' at the inner end of the tube is of less diameter than the bore and is closed by a rectangular piece of soft rubber placed over the end of the tube and forming a check valve 16 which opens into the member. A yielding member 17 of cross-shape formed of rubber or other like material extends over the outer side of the valve and its arms 17' are bent over the four edges of the valve and alongside of the valve tube 13, and are cemented or otherwise fastened thereto.

In use the inner member is inflated by inserting the stem of an air pump through the laced slit when opened and into the bore of the valve tube and operating the pump. When thus operated the air under pressure from the pump will slightly raise the valve from its seat and escape into the member and inflate the same, and when the desired pressure within the member has been obtained the pump is removed and the slit of the outer casing laced up to close the opening. As the valve opens inwardly into the inflatable member the pressure of the air within said member will tightly force the soft rubber valve against the inner end of the tube and efficiently seal the opening and prevent the egress of air from the member.

It will be noted that the valve in its entirety is formed of rubber or like yielding material, and that there is no hard material to abrade the inflatable member, and that the valve tube is never bent but always remains in its normal position, and that the valve is so positioned that it cannot be accidentally injured. From the foregoing description it will be seen that the pneumatic ball valve is extremely inexpensive to manufacture.

What I claim as my invention is:

In combination with an outer pneumatic ball casing having a laced entrance opening and a flap covering the inner side of said opening, of an inner member therefor, comprising an inflatable inner casing having an inwardly extending open ended tube forming part thereof, said tube also having a portion provided with a head which projects a short distance outside of said inner casing, said outer casing flap provided with an opening through which the outwardly projecting headed portion extends, a rectangular shaped piece of material bearing against the inner open end of the tube, and a cross shaped piece of elastic material bearing against the outer side of the valve with the arm portions of the cross shaped piece of material extending over the straight edge portions of the rectangular piece of material and the outer side portions of the tube, and connected to said tube for yieldingly holding the valve in position.

In testimony whereof I affix my signature.

ROBERT M. ZIMMERMAN.